United States Patent
Li et al.

(10) Patent No.: US 11,929,585 B2
(45) Date of Patent: Mar. 12, 2024

(54) MIXER-BASED MICROWAVE SIGNAL GENERATION DEVICE

(71) Applicant: INSTITUTE OF SEMICONDUCTORS, CHINESE ACADEMY OF SCIENCES, Beijing (CN)

(72) Inventors: Ming Li, Beijing (CN); Tengfei Hao, Beijing (CN); Qizhuang Cen, Beijing (CN); Yitang Dai, Beijing (CN); Nuannuan Shi, Beijing (CN); Wei Li, Beijing (CN)

(73) Assignee: INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 415 days.

(21) Appl. No.: 17/449,295

(22) Filed: Sep. 29, 2021

(65) Prior Publication Data
US 2022/0158400 A1     May 19, 2022

(30) Foreign Application Priority Data
Nov. 19, 2020 (CN) .......................... 202011307612.7

(51) Int. Cl.
*H01S 1/00* (2006.01)
*G01S 7/32* (2006.01)

(52) U.S. Cl.
CPC . *H01S 1/00* (2013.01); *G01S 7/32* (2013.01)

(58) Field of Classification Search
CPC ..... H01S 1/00; H01S 1/02; G01S 7/32; G02F 1/03
See application file for complete search history.

(56) References Cited

U.S. PATENT DOCUMENTS

| 2005/0123306 A1* | 6/2005 | Ilchenko | G02B 6/29395 398/161 |
| 2005/0248823 A1* | 11/2005 | Maleki | H04B 10/2575 359/245 |

* cited by examiner

Primary Examiner — Jeffrey M Shin
(74) Attorney, Agent, or Firm — Christopher R. Christenson; Kelly, Holt & Christenson, PLLC

(57) ABSTRACT

A mixer-based microwave signal generation device is provided, and the mixer-based microwave signal generation device includes a microwave local oscillator source, a mixer, a first filter, a laser, an electro-optic modulator, an optical signal delayer, a photodetector, a second filter, an amplifier and a passive power divider.

11 Claims, 3 Drawing Sheets

MIXER-BASED MICROWAVE SIGNAL GENERATION DEVICE

CROSS REFERENCE TO RELATED APPLICATION(S)

The present disclosure claims priority to Chinese Patent Application No. 202011307612.7 filed on Nov. 19, 2020, which is incorporated herein by reference in its entirety.

TECHNICAL FIELD

The present disclosure relates to a field of microwave photonics, and in particular to a mixer-based microwave signal generation device.

BACKGROUND

A microwave signal source has a function of generating a desired microwave signal for a microwave system such as radar, communication network and sensor. A conventional microwave signal source is generally implemented based on purely electronic means. However, the electronics-based means face a problem of a bandwidth bottleneck, and it is difficult to achieve a microwave signal source with a large bandwidth and a high center frequency. A microwave photonic technology is an interdisciplinary subject in which an electronic technology and a photonic technology are combined, and it benefits from advantages of large bandwidth, low loss and anti-electromagnetic interference brought by the photonic technology. A microwave signal source based on the microwave photonic technology may overcome disadvantages of pure electronic means, so as to achieve a microwave signal source with a large bandwidth and a high center frequency.

In recent years, researchers in the field have proposed a variety of methods of generating a microwave signal based on the microwave photonic technology, mainly including a dual-wavelength laser heterodyne method, a frequency-time mapping method, an optoelectronic oscillator, and so on. The dual-wavelength laser heterodyne method is implemented to detect a beat frequency of two emission wavelengths of a laser by using a photodetector, which may easily generate a microwave signal with a broadband and a high center frequency. However, when a coherence of the two emission wavelengths is generally poor, the microwave signal generated by the beat frequency has poor phase noise characteristics. A core idea of the frequency-time mapping method includes firstly shaping an optical signal in a frequency domain, and then mapping a shaped spectrum to a time-domain waveform of a microwave signal by means of a dispersive medium. The frequency-time mapping method may be implemented to generate a microwave signal with a broadband, and the microwave signal generally has a small duration, therefore a time-bandwidth product is limited. The optoelectronic oscillator is implemented to form a closed optoelectronic feedback loop by optoelectronic devices such as an electro-optic modulator and a photodetector, so as to generate a microwave signal by a self-excited oscillation. By means of a feedback loop with high quality factors, the optoelectronic oscillator may generate a single-frequency microwave signal with ultra-low phase noise. However, when the optoelectronic oscillator operates in a multi-mode state, an initial phase in each mode is random, and a mode competition and a mode hopping effect may exist in a cavity, so that it is difficult to obtain a stable multi-mode signal.

SUMMARY

The present disclosure provides a mixer-based microwave signal generation device, including: a microwave local oscillator source configured to generate a local oscillator microwave signal; a mixer configured to perform a frequency conversion on a microwave signal generated by a self-excited oscillation of the device under an excitation of the local oscillator microwave signal, and output a single-mode or multi-mode oscillator microwave signal; a first filter configured to filter the single-mode or multi-mode oscillator microwave signal, so as to obtain a single-mode or multi-mode self-excited oscillator signal; a laser configured to generate an optical carrier; an electro-optic modulator configured to load the single-mode or multi-mode self-excited oscillator signal onto the optical carrier, so as to obtain an optical signal; an optical signal delayer configured to delay the optical signal; a photodetector configured to perform a beat frequency restoration on the optical signal delayed, so as to obtain a microwave signal; a second filter configured to filter the microwave signal so as to obtain a delayed single-mode or multi-mode oscillator microwave signal; an amplifier configured to amplify a power of the delayed single-mode or multi-mode oscillator microwave signal; a passive power divider configured to perform a power distribution on the delayed single-mode or multi-mode oscillator microwave signal with the amplified power so as to obtain two groups of microwave signals, input one of the two groups of microwave signals to the mixer for a next cycle, and output the another one of the two groups of microwave signals, wherein each of the two groups of microwave signals includes the delayed single-mode or multi-mode oscillator microwave signal with the amplified power halved.

Further, each pair of microwave signals including a microwave signal with a frequency $f_1$ and a microwave signal with a frequency $f_2$ have mode frequencies meeting a relationship of $f_1+f_2=f_0$ and $f_1, f_2=f_0/2\pm M\Delta f$, where $f_0$ indicates a frequency of the local oscillator microwave signal, $f_1$ indicates a frequency of the microwave signal generated by the self-excited oscillation of the device, $f_2$ indicates a frequency of the oscillator microwave signal output by the mixer, where $M\geq 0$, and M is an integer, $\Delta f=c/(2L)$ indicates a frequency step introduced by the closed optoelectronic feedback loop, c indicates a speed of light in vacuum, and L indicates a valid length of the closed optoelectronic feedback loop.

Further, the microwave signal with the frequency $f_1$ and the microwave signal with the frequency $f_2$ have phases meeting a relationship of $\varphi_1+\varphi_2=-\pi f_0 L/c\pm N\pi$, where N is a positive integer, $\varphi_1$ indicates a phase of the microwave signal with the frequency $f_1$, and $\varphi_2$ indicates a phase of the microwave signal with the frequency $f_2$.

Further, the device is a single-loop device including one optical signal delayer and one photodetector that are connected to each other; or a double-loop device including two optical signal delayers and two photodetectors that are connected in a one-to-one correspondence; or a multi-loop device including a plurality of optical signal delayers and a plurality of photodetectors that are connected in a one-to-one correspondence.

Further, a position of the amplifier is interchanged with a position of the first filter or a position of the second filter.

Further, the optical signal delayer includes a long optical fiber with a length of 1 m to 20 km and an optical loss of 0.2 dB/km.

Further, a response mode of the first filter and a response mode the second filter have a band-pass characteristic.

Further, the electro-optic modulator has a bandwidth of 0 to 150 GHz.

Further, the photodetector has a bandwidth of 0 to 150 GHz and a responsivity of 1 A/W.

Further, the amplifier has a gain of 1 dB to 60 dB.

BRIEF DESCRIPTION OF THE DRAWINGS

For a more complete understanding of the present disclosure and its advantages, reference will now be made to the following description in conjunction with the accompanying drawings.

DETAILED DESCRIPTION OF EMBODIMENTS

Embodiments of the present disclosure will be described below with reference to the accompanying drawings. It should be understood, that these descriptions are merely exemplary and are not intended to limit the scope of the present disclosure. In the following detailed description, for ease of interpretation, many specific details are set forth to provide a comprehensive understanding of the embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The terms "comprising", "including", and the like used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

The present disclosure provides a mixer-based microwave signal generation device. A mixer of the device may lock a sum of a phase of a microwave signal before a frequency conversion and a phase of a microwave signal after the frequency conversion while performing the frequency conversion on the microwave signal generated by a self-excited oscillation of a closed optoelectronic feedback loop. Therefore, the phase of the microwave signal generated by the self-excited oscillation is not random, and a stable multi-mode oscillator microwave signal may be obtained.

Figure 1:
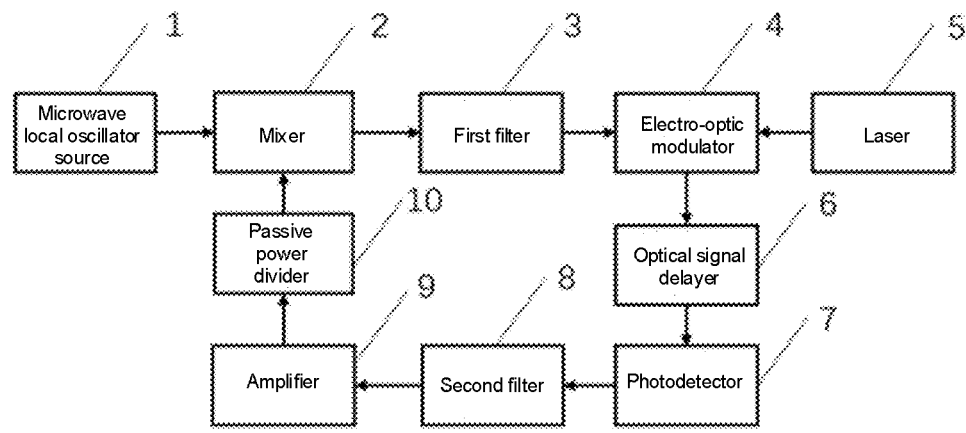
FIG. 1 schematically shows a structural diagram of a mixer-based microwave signal generation device according to an embodiment of the present disclosure.

FIG. 1 schematically shows a structural diagram of a mixer-based microwave signal generation device according to an embodiment of the present disclosure.

As shown in FIG. 1, the present disclosure provides a mixer-based microwave signal generating device, including a microwave local oscillator source 1, a mixer 2, a first filter 3, an electro-optic modulator 4, a laser 5, an optical signal delayer 6, a photodetector 7, a second filter 8, an amplifier 9 and a passive power divider 10.

The microwave local oscillator source 1 is used to generate a local oscillator microwave signal.

In this embodiment, the microwave local oscillator source 1 is used to generate a local oscillator microwave signal. The local oscillator microwave signal output is a single-frequency sinusoidal signal with a bandwidth of 40 GHz or more that is used to provide a local oscillator excitation to the mixer 2.

The mixer 2 is used to perform a frequency conversion on a microwave signal generated by a self-excited oscillation in the device under the excitation of the local oscillator microwave signal, so as to obtain a single-mode or multi-mode oscillator microwave signal.

In this embodiment, the mixer 2 has a first input end connected to an output end of the microwave local oscillator source 1. The mixer 2 is used to perform the frequency conversion on the microwave signal generated by the self-excited oscillation in the device under the excitation of the local oscillator microwave signal, and output a single-mode or multi-mode oscillator microwave signal. When the microwave signal generated by the self-excited oscillation is a single-mode microwave signal, a single-mode oscillator microwave signal is output after the frequency mixing by the mixer 2. When the microwave signal generated by the self-excited oscillation is a multi-mode microwave signal, a multi-mode oscillator microwave signal is output after the frequency mixing by the mixer 2. Whether the microwave signal generated by the self-excited oscillation is a single-mode oscillator microwave signal or a multi-mode oscillator microwave signal may be determined according to a bandwidth set by the first filter 3 and the second filter 8.

The first filter 3 is used to filter the single-mode or multi-mode oscillator microwave signal, so as to obtain a single-mode or multi-mode self-excited oscillator signal.

In this embodiment, the first filter 3 has an input end connected to an output end of the mixer 2. The first filter 3 is used to filter the single-mode or multi-mode oscillator microwave signal, so as to obtain a single-mode or multi-mode self-excited oscillator signal. A response mode of the first filter 3 has a band-pass characteristic, and a microwave signal with a specific frequency in the pass band may be selected to oscillate.

The laser 5 is used to generate an optical carrier.

In this embodiment, the laser 5 has an output end connected to a first input end of the electro-optic modulator 4. The laser 5 is used to provide an optical carrier to the electro-optic modulator 4 for an electro-optic modulation.

The electro-optic modulator 4 is used to load the single-mode or multi-mode self-excited oscillator signal onto the optical carrier so as to obtain an optical signal.

In this embodiment, the electro-optic modulator 4 has a second input end connected to an output end of the first filter 3. The electro-optic modulator 4 is used to load the single-mode or multi-mode self-excited oscillator signal onto the optical carrier so as to obtain an optical signal. The electro-optic modulator 4 has a bandwidth of 0 to 150 GHz, and may load a single-mode or multi-mode self-excited oscillator signal with a frequency of 0 to 150 GHz onto the optical carrier.

The optical signal delayer 6 is used to delay the optical signal.

In this embodiment, the optical signal delayer 6 has an input end connected to an output end of the electro-optic modulator 4, and is used to delay the optical signal. The optical signal delayer 6 includes a long optical fiber with a length of 1 m to 20 km and an optical loss of 0.2 dB/km. The long optical fiber may be used to delay the optical signal by 5 ps to 100 μs.

The photodetector 7 is used to perform a beat frequency restoration on the optical signal delayed, so as to obtain a microwave signal.

In this embodiment, the photodetector 7 has an input end connected to an output end of the optical signal delayer 6, and is used to perform the beat frequency restoration on the optical signal delayed, so as to obtain a microwave signal.

In this embodiment, the photodetector 7 has a bandwidth of 0 to 150 GHz and a responsivity of 1 A/W, and is used to perform the beat frequency restoration on the optical signal delayed, so as to obtain a microwave signal with a frequency of 0 to 150 GHz.

The second filter 8 is used to filter the microwave signal, so as to obtain a delayed single-mode or multi-mode oscillator microwave signal.

In this embodiment, the second filter 8 has an input end connected to an output end of the photodetector 7. A response mode of the second filter 8 has a band-pass characteristic. The first filter 3 and the second filter 8 are provided to filter the transmitted signal before and after, respectively. With the two filtering, an oscillator microwave signal with a purer spectrum may be obtained.

The amplifier 9 is used to amplify a power of the delayed single-mode or multi-mode oscillator microwave signal.

In this embodiment, the amplifier 9 has an input end connected to an output end of the second filter 8, and the amplifier 9 has an output end connected to an input end of the passive power divider 10. The amplifier 9 is used to amplify the power of the delayed single-mode or multi-mode oscillator microwave signal.

In some embodiments, the amplifier 9 has a gain of 1 dB to 60 dB.

The passive power divider 10 is used to perform a power distribution on the delayed single-mode or multi-mode oscillator microwave signal with the amplified power so as to obtain two groups of microwave signals, input one of the two groups of microwave signals to the mixer 2 for a next cycle, and output another one of the two groups of microwave signals. Each of the two groups of microwave signals may include the delayed single-mode or multi-mode oscillator microwave signal with the amplified power halved.

In this embodiment, the passive power divider 10 has an input end connected to an output end of the optical amplifier 9, a first output end connected to a second input end of the mixer 2, and a second output end acting as a microwave signal output end. The passive power divider 10 is used to perform the power distribution on the delayed single-mode or multi-mode oscillator microwave signal, so as to obtain two groups of microwave signals. One of the two groups of microwave signals is output from the first output end of the passive power divider 10 to the mixer 2 for a next cycle, and another one of the two groups of microwave signals is output from the second output end of the passive power divider 10 so as to provide a continuous and stable microwave signal for next processing.

In this embodiment, the microwave local oscillator source 1, the mixer 2, the first filter 3 and the electro-optic modulator 4, the photodetector 7, the second filter 8 and the amplifier 9 are connected by an electric cable, and the electro-optic modulator 4, the laser 5, the optical signal delayer 6 and the photodetector 7 are connected by an optical fiber patch cord.

An operating principle of the mixer-based microwave signal generation device provided in this embodiment is as follows. The microwave local oscillator source 1 may generate a local oscillator microwave signal with a frequency $f_0$ and output the local oscillator microwave signal to the mixer 2. The mixer 2 may perform a frequency conversion on the microwave signal generated by the self-exited oscillator in the device under the excitation of the local oscillator microwave signal, and output a single-mode or multi-mode oscillator microwave signal according to a preset bandwidth of the mixer 2. The single-mode or multi-mode oscillator microwave signal is input into the first filter 3 for filtering, so as to obtain a single-mode or multi-mode self-excited oscillator signal. The laser 5 may generate an optical carrier and input the optical carrier into the electro-optic modulator 4. The single-mode or multi-mode self-excited oscillator signal is input into the electro-optic modulator 4, and the electro-optic modulator 4 may load the single-mode or multi-mode self-excited oscillator signal on the optical carrier so as to obtain an optical signal. The optical signal delayer 6 may delay the optical signal so as to obtain a delayed optical signal and output the delayed optical signal to the photodetector 7. The photodetector 7 may perform a beat frequency restoration on the delayed optical signal by using an optoelectronic effect so as to obtain a microwave signal. After a secondary filtering by the second filter 8, the microwave signal is output to the amplifier 9 for a power amplification, so as to obtain a delayed single-mode or multi-mode oscillator microwave signal with the amplified power. The delayed single-mode or multi-mode oscillator microwave signal with the amplified power is input into the passive power divider 10 for a power distribution, and then two groups of microwave signals may be obtained. Each of the two groups of microwave signals may include the delayed single-mode or multi-mode oscillator microwave signal with the amplified power halved. The passive power divider 10 may input one of the two groups of microwave signals to the mixer 2 for a next cycle, and output another one of the two groups of microwave signals. The device may generate a stable single-mode or multi-mode microwave oscillator signal under an effect of the frequency conversion of the mixer and the self-excited oscillation of a closed optoelectronic feedback loop.

In this embodiment, the mixer 2, the first filter 3, the electro-optic modulator 4, the optical signal delayer 6, the photodetector 7, the second filter 8, the amplifier 9 and the passive power divider 10 constitute the closed optoelectronic feedback loop. When a gain of the closed optoelectronic feedback loop is greater than a loss, a microwave signal may be generated by the self-excited oscillation. If a microwave signal generated by the self-excited oscillation has a frequency $f_1$. When the signal passes through the mixer 2, a frequency conversion may be performed, and the signal output by the mixer 2 may have a frequency of $$f_2 = f_0 - f_1 \qquad \text{Equation (1)}$$

where $f_0$ indicates a frequency of the local oscillator microwave signal generated by the microwave local oscillator source. If the microwave signal generated by the self-excited oscillation of the device is a single-mode microwave signal, the single-mode microwave signal has a frequency $f_1$, the single-mode oscillator microwave signal output by the mixer 2 has a frequency $f_2$, and $f_1+f_2=f_0$, $f_1=f_2=f_0/2$. If the microwave signal generated by the self-excited oscillation is a multi-mode microwave signal, the multi-mode microwave signal has frequencies of $f_1'$, $f_1''$, $f_1'''$, ..., $f_1^{2n}$, $f_1^{2n+1}$, and the multi-mode oscillator microwave signal output by the mixer 2 has frequencies of $f_2'$, $f_2''$, $f_2'''$ ... $f_2^{2n+1}$, and $f_1'+f_2'=f_0$, $f_1''+f_2'=f_0$, ..., $f_1^{2n}+f_2^{2n}=f_0$, $f_1^{2n+1}+f_2^{2n+1}=f_0$. The microwave signal after the frequency conversion is filtered by the first filter 3 and input to the electro-optic modulator 4, then transmitted by the optical signal delayer 6 and restored by the photodetector 7 to a microwave signal with the frequency $f_2$. A value of the frequency $f_2$ is equal to a value of the frequency of the signal output by the mixer 2. The microwave signal is used as a new input of the mixer 2 after passing through the closed optoelectronic feedback loop, and then converted again. Therefore, the microwave signal with the frequency $f_2$ may be converted into a microwave signal with the frequency $f_1$. After a new cycle of transmission in the closed optoelectronic feedback loop, the microwave signal with the frequency $f_1$ may enter the mixer 2 again, and then the frequency conversion described above may be repeatedly performed. Therefore, the oscillator signals in the device may exist in pairs, and a sum of the frequencies of each pair of signals is equal to the frequency $f_0$ of the local oscillator microwave signal. According to a mode self-reproduction condition, each pair of modes may have frequencies of $$f_1, f_2 = f_0/2 \pm M\Delta f \quad \text{Equation (2)}$$

where M≥0, and M is an integer, $\Delta f=c/(2L)$ indicates a frequency step introduced by the closed optoelectronic feedback loop, c indicates a speed of light in vacuum, and L indicates a valid length of the closed optoelectronic feedback loop. According to Equation (2), the frequencies of each pair of modes are symmetrical with respect to half of the microwave local oscillator frequency $f_0/2$, and a minimum interval between the frequencies is $\Delta f$. The phases of each pair of modes may satisfy:

$$\varphi_1+\varphi_2=-\pi f_0 L/c \pm N\pi \quad \text{Equation (3)}$$

where N is a positive integer, $\varphi_1$ indicates the phase of the microwave signal with the frequency $f_1$, and $\varphi_2$ indicates the phase of the microwave signal with the frequency $f_2$. According to Equation (3), a sum of the phases of a pair of microwave signals before and after the frequency conversion by the mixer 2 is locked, and the phase of the microwave signal generated by the self-excited oscillation is not random. When the phase of one mode in a pair of modes is determined, the phase of another mode is determined accordingly. Therefore, the mixer-based microwave signal generation device provided by the present disclosure may obtain a stable multi-mode oscillation microwave signal. In addition, a center frequency of the microwave signal generated in the present disclosure depends on the frequency of the local oscillator microwave signal, and therefore may be adjusted by controlling the frequency of the local oscillator microwave signal. A maximum frequency range of the microwave signal generated in the present disclosure is determined by the filter, therefore the single-mode or multi-mode oscillator microwave signal may be selected by changing the bandwidth of the filter.

Figure 2:
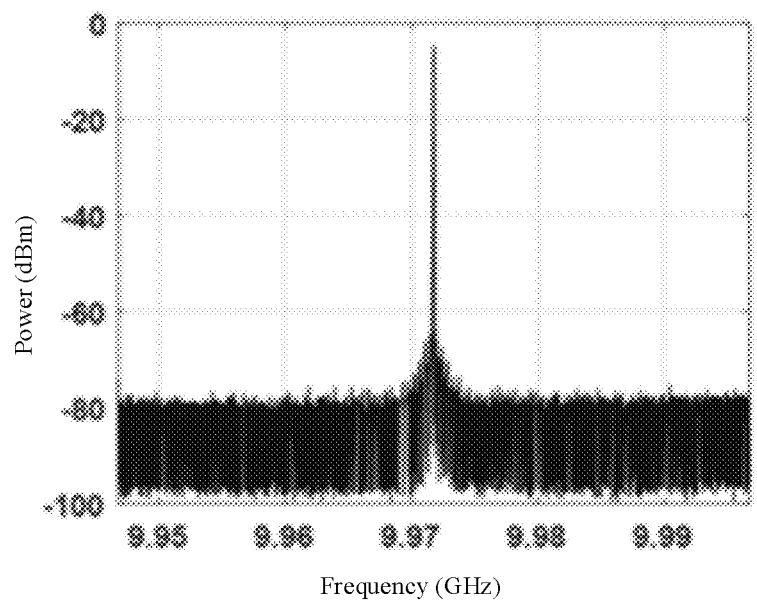
FIG. 2 schematically shows a frequency spectrum diagram of a single-mode oscillator microwave signal generated according to an embodiment of the present disclosure.

FIG. 2 schematically shows a frequency spectrum diagram of a single-mode oscillator microwave signal generated according to an embodiment of the present disclosure. As shown in FIG. 2, the frequency of the single-mode oscillator microwave signal is about 9.972 GHz, which is equal to half of the frequency of the local oscillator microwave signal generated by the microwave local oscillator source. The frequency of the single-mode oscillator microwave signal after the frequency conversion is equal to the frequency of the microwave signal before the frequency conversion, which verifies that a narrow-band filter may be used to filter out other frequency components other than the frequency of the single-mode oscillator microwave signal.

Figure 3:
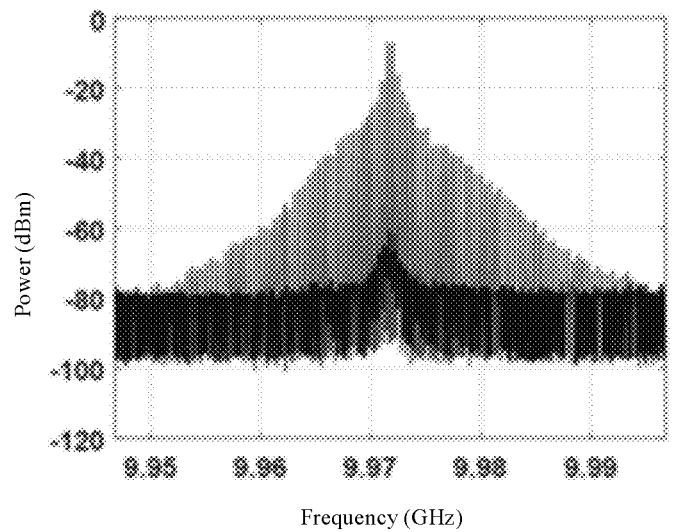
FIG. 3 schematically shows a frequency spectrum diagram of a multi-mode oscillator microwave signal generated according to an embodiment of the present disclosure.

FIG. 3 schematically shows a frequency spectrum diagram of a multi-mode oscillator microwave signal generated according to an embodiment of the present disclosure. As shown in FIG. 3, the mixer-based microwave signal generation device provided by the present disclosure may obtain a multi-mode oscillator microwave signal. By filtering the microwave signal using two broadband filters before and after, respectively, a stable broadband multi-mode oscillator microwave signal may be generated.

Figure 4:
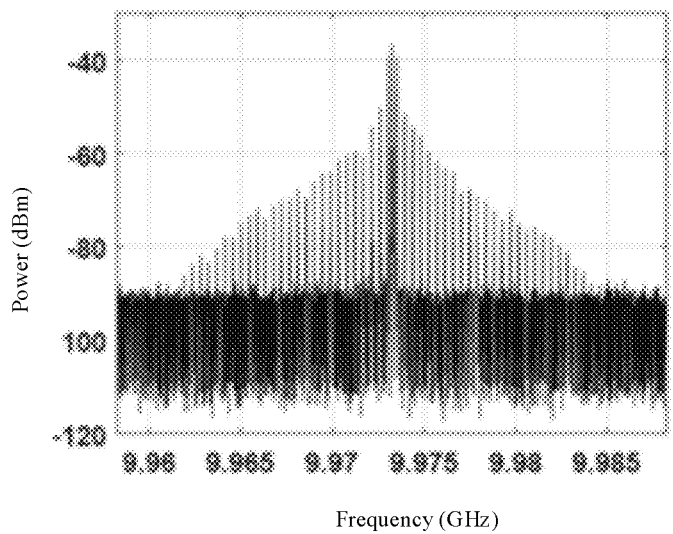
FIG. 4 schematically shows a frequency spectrum diagram of another multi-mode oscillator microwave signal generated according to an embodiment of the present disclosure.

FIG. 4 schematically shows a frequency spectrum diagram of another multi-mode oscillator microwave signal generated according to an embodiment of the present disclosure. Compared with the multi-mode oscillator microwave signal in FIG. 3, the multi-mode oscillator microwave signal in FIG. 4 of which the frequency is equal to half the frequency of the local oscillator microwave signal is also oscillating. In this case, the multi-mode oscillator microwave signal has more abundant spectrum details, and accordingly more complex oscillation characteristics.

In another embodiment of the present disclosure, a position of the amplifier 9 may be interchanged with a position of the first filter 3 or a position of the second filter 8, which may also achieve the technical effect in the embodiments described above.

In another embodiment of the present disclosure, a number of the filters may be reduced or increased to change a filtering effect.

Figure 5:
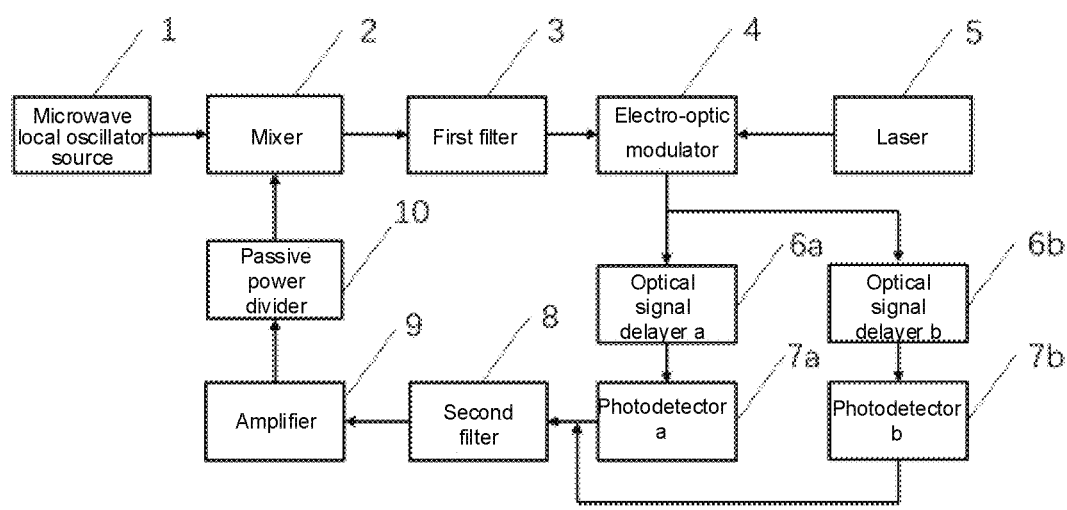
FIG. 5 schematically shows a structural diagram of a mixer-based microwave signal generation device according to another embodiment of the present disclosure.

In another embodiment of the present disclosure, the device may be a single-loop device including one optical signal delayer 6 and one photodetector 7 that are connected to each other; or a double-loop device including two optical signal delayers 6 and two photodetectors 7 that are connected in a one-to-one correspondence as shown in FIG. 5; or a multi-loop device including a plurality of optical signal delayer 6 and a plurality of photodetector 7 that are connected in a one-to-one correspondence. When the device is a dual-loop or a multi-loop device, due to a vernier caliper effect, a mode interval of the microwave signal in the device is jointly determined by a length of each loop of the dual-loop or the multi-loop. Therefore, the mode interval is greater than a mode interval in a case of a single-loop device, so that the single-mode or multiple-mode oscillator signal may be selected more easily.

In addition, the device structure provided in the embodiments described above does not constitute a limitation of the device. The number, shape and size of the components in the device may be modified according to actual conditions, and the configuration of the components may be more complicated.

Compared with the related art, the present disclosure has following technical benefits.

(1) The mixer of the present disclosure may perform the frequency conversion on the microwave signal generated by the self-excited oscillation of the closed optoelectronic feedback loop in the device under the excitation of the local oscillator microwave signal. A sum of the frequency of the microwave signal before the frequency conversion and the frequency of the microwave signal after the frequency conversion is equal to the frequency of the local oscillator microwave signal, and the frequency of the microwave signal before the frequency conversion and the frequency of the microwave signal after the frequency conversion exist in pairs. A certain frequency component in a pair of frequencies may achieve a self-reproduction after two cycles of transmission in the closed feedback loop. Therefore, a minimum interval between the frequencies is half of a free spectral range of the closed feedback loop.

(2) The mixer of the present disclosure may lock a sum of the phase of the microwave signal before the frequency conversion and the phase of the microwave signal after the frequency conversion while performing the frequency conversion on the microwave signal generated by the self-excited oscillation of the closed optoelectronic feedback loop. Therefore, the phase of the microwave signal generated by the self-excited oscillation is not random, and a stable multi-mode oscillator microwave signal may be obtained.

(3) A center frequency of the microwave signal generated by the microwave signal generation device provided by the present disclosure depends on the frequency of the local oscillator microwave signal, and therefore may be adjusted by controlling the frequency of the local oscillator microwave signal. A maximum frequency range of the microwave signal generated is determined by the filter, and therefore the single-mode or multi-mode oscillator microwave signal may be selected by changing the bandwidth of the filter.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

Although the present disclosure has been shown and described with reference to specific exemplary embodiments of the present disclosure, those skilled in the art may understand that without departing from the spirit and scope of the present disclosure defined by the appended claims and their equivalents, various modifications in form and details may be made to the present disclosure. Therefore, the scope of the present disclosure should not be limited to the embodiments described above, but should be defined by the appended claims and their equivalents.

What is claimed is:

1. A mixer-based microwave signal generation device, comprising:
  a microwave local oscillator source configured to generate a local oscillator microwave signal;
  a mixer configured to perform a frequency conversion on a microwave signal generated by a self-excited oscillation of a closed optoelectronic feedback loop of the device under an excitation of the local oscillator microwave signal, and output a single-mode or multi-mode oscillator microwave signal;
  a first filter configured to filter the single-mode or multi-mode oscillator microwave signal, so as to obtain a single-mode or multi-mode self-excited oscillator signal;
  a laser configured to generate an optical carrier;
  an electro-optic modulator configured to load the single-mode or multi-mode self-excited oscillator signal onto the optical carrier, so as to obtain an optical signal;
  an optical signal delayer configured to delay the optical signal;
  a photodetector configured to perform a beat frequency restoration on the optical signal delayed, so as to obtain a microwave signal;
  a second filter configured to filter the microwave signal so as to obtain a delayed single-mode or multi-mode oscillator microwave signal;
  an amplifier configured to amplify a power of the delayed single-mode or multi-mode oscillator microwave signal; and
  a passive power divider configured to perform a power distribution on the delayed single-mode or multi-mode oscillator microwave signal with the amplified power so as to obtain two groups of microwave signals, input one of the two groups of microwave signals to the mixer for a next cycle, and output another one of the two groups of microwave signals, wherein each of the two groups of microwave signals comprises the delayed single-mode or multi-mode oscillator microwave signal with the amplified power halved.

2. The mixer-based microwave signal generation device according to claim 1, wherein each pair of microwave signals including a microwave signal with a frequency $f_1$ and a microwave signal with a frequency $f_2$ have mode frequencies meeting a relationship of $$f_1+f_2=f_0,$$

$$f_1,f_2=f_0/2\pm M\Delta f$$

wherein $f_0$ indicates a frequency of the local oscillator microwave signal generated by the microwave local oscillator source, $f_1$ indicates a frequency of the microwave signal generated by the self-excited oscillation of the closed optoelectronic feedback loop of the device, $f_2$ indicates a frequency of the oscillator microwave signal output by the mixer, wherein M≥0, and M is an integer, $\Delta f=c/(2L)$ indicates a frequency step introduced by the closed optoelectronic feedback loop, c indicates a speed of light in vacuum, and L indicates a valid length of the closed optoelectronic feedback loop.

3. The mixer-based microwave signal generation device according to claim 2, wherein the microwave signal with the frequency $f_1$ and the microwave signal with the frequency $f_2$ have phases meeting a relationship of $$\varphi_1+\varphi_2=-\pi f_0 L/c \pm N\pi$$

wherein N is a positive integer, $\varphi_1$ indicates a phase of the microwave signal with the frequency $f_1$, and $\varphi_2$ indicates a phase of the microwave signal with the frequency $f_2$.

4. The mixer-based microwave signal generation device according to claim 1, wherein the device is a single-loop device comprising one optical signal delayer and one photodetector that are connected to each other; or a double-loop device comprising two optical signal delayers and two photodetectors that are connected in a one-to-one correspondence; or a multi-loop device comprising a plurality of optical signal delayers and a plurality of photodetectors that are connected in a one-to-one correspondence.

5. The mixer-based microwave signal generation device according to claim 1, wherein a position of the amplifier is interchanged with a position of the first filter or a position of the second filter.

6. The mixer-based microwave signal generation device according to claim 1, wherein the optical signal delayer comprises a long optical fiber with a length of 1 m to 20 km and an optical loss of 0.2 dB/km.

7. The mixer-based microwave signal generation device according to claim 1, wherein a response mode of the first filter and a response mode the second filter have a band-pass characteristic.

8. The mixer-based microwave signal generation device according to claim 1, wherein the electro-optic modulator has a bandwidth of 0 to 150 GHz.

9. The mixer-based microwave signal generation device according to claim 1, wherein the photodetector has a bandwidth of 0 to 150 GHz and a responsivity of 1 A/W.

10. The mixer-based microwave signal generation device according to claim 1, wherein the amplifier has a gain of 1 dB to 60 dB.

11. The mixer-based microwave signal generation device according to claim 2, wherein the optical signal delayer comprises a long optical fiber with a length of 1 m to 20 km and an optical loss of 0.2 dB/km.

\* \* \* \* \*